United States Patent [19]

Pinkus et al.

[11] 4,455,026
[45] Jun. 19, 1984

[54] VEE-SHAPED MAGNETIC/CENTRIFUGAL SEAL AND METHOD OF OPERATION

[75] Inventors: Oscar Pinkus, Guilderland; Donald F. Wilcock, Schenectady, both of N.Y.

[73] Assignee: Mechanical Technology Incorporated, Latham, N.Y.

[21] Appl. No.: 447,652

[22] Filed: Dec. 7, 1982

[51] Int. Cl.³ .............................................. F16J 15/42
[52] U.S. Cl. .......................................... 277/1; 277/13; 277/80
[58] Field of Search .......................... 277/13, 14, 80, 1

[56] References Cited

U.S. PATENT DOCUMENTS

| | | | |
|---|---|---|---|
| 2,665,929 | 1/1954 | Sawyer | 286/9 |
| 3,620,584 | 11/1971 | Rosensweig | 308/187.1 |
| 4,200,296 | 4/1980 | Stahl et al. | 277/13 |
| 4,304,411 | 12/1981 | Wilcock et al. | 277/13 |
| 4,335,885 | 6/1982 | Heshmat | 277/80 |
| 4,357,024 | 11/1982 | Raj | 277/1 |

*Primary Examiner*—Robert I. Smith
*Attorney, Agent, or Firm*—Joseph V. Claeys; Arthur N. Trausch, III

[57] ABSTRACT

A combined magnetic/centrifugal seal for a rotating shaft rotatably journalled within a housing. The rotating shaft has a generally circular cross section and at least one radially extending generally Vee-shaped cross section circumferential portion formed about its periphery. A plurality of radially extending circumferential teeth are concentrically arrayed around the periphery of the rotating shaft in parallel relationship to the Vee-shaped circumferential portion on the rotating shaft on at least one of its sides and spaced closely adjacent thereto. The housing has a complementary generally Vee-shaped cross section within which the Vee-shaped circumferential portion of the rotating shaft rides and in conjunction with the Vee-shaped cross section portion defines a space within which the concentrically arrayed circumferential teeth extend. A magnetically susceptible ferrofluid is disposed within this space for forming a centrifugal seal during high speed rotation of the shaft and the ferrofluid communicates with the gaps formed between the ends of the concentrically arrayed circumferential teeth and the opposite surfaces of the rotating shaft on each side of the Vee-shaped cross section circumferential teeth. A magnetic field is impressed across the gaps thus defined to form a plurality of magnetic seal stages with the shaft at standstill and at low rotating speeds.

9 Claims, 6 Drawing Figures

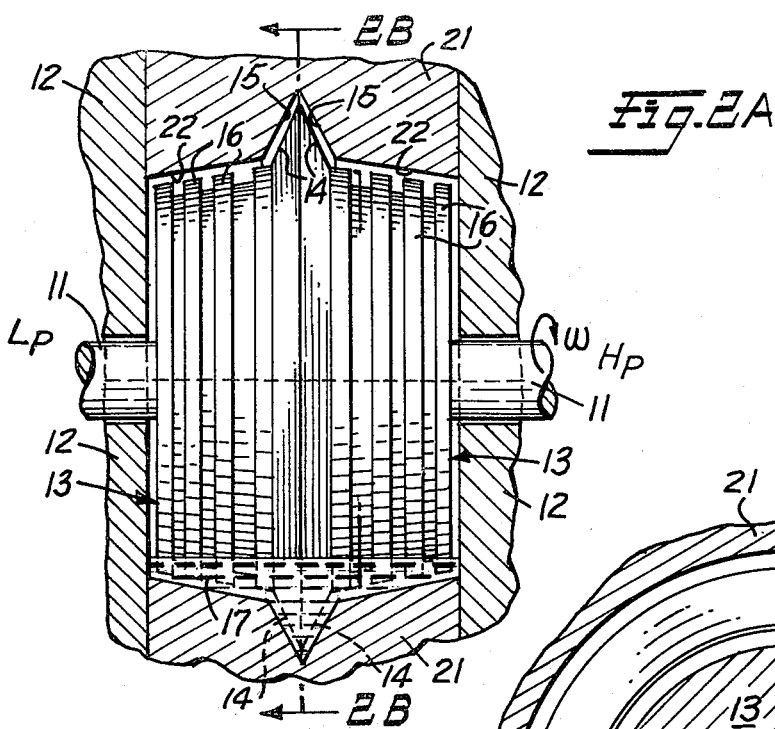
Fig.2A
Fig.2B
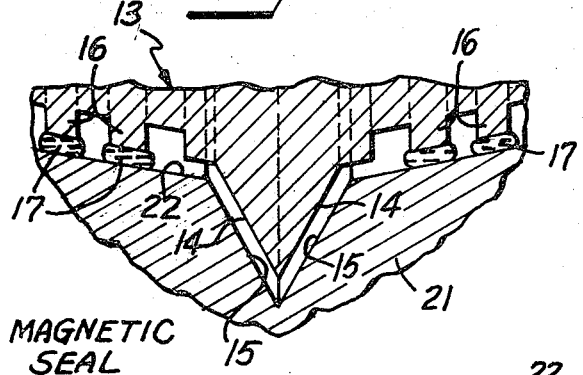
MAGNETIC SEAL
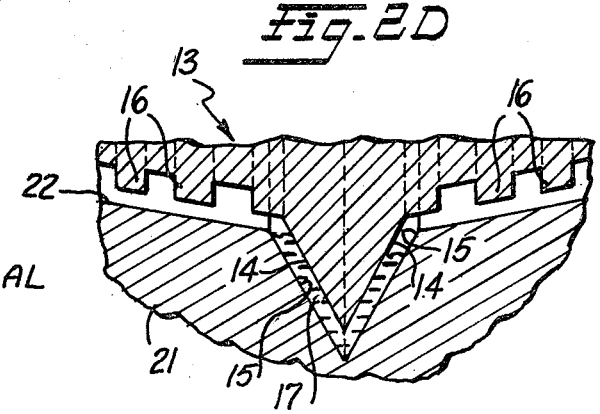
CENTRIFUGAL SEAL 4,455,026

VEE-SHAPED MAGNETIC/CENTRIFUGAL SEAL AND METHOD OF OPERATION

TECHNICAL FIELD

This invention relates to a new and improved Vee-shaped magnetic/centrifugal seal and method of operation.

More particularly, the invention relates to an improved Vee-shaped magnetic/centrifugal seal of the type which employs a ferrofluidic fluid for accomplishing magnetic sealing of a rotating shaft within its housing at standstill and at low rotating shaft speeds and at high rotating shaft speeds provides centrifugal sealing.

BACKGROUND ART

U.S. Pat. No. 4,204,411, issued Dec. 8, 1981, Donald F. Wilcock and Martin W. Eusepi, co-inventors, entitled "Magnetic/Centrifugal Fluid Seal," assigned to Mechanical Technology, Inc., of Latham, N.Y., describes and claims a number of different novel, combined magnetic/centrifugal seal structures wherein both magnetic sealing is provided at standstill and at low rotating speeds and centrifugal sealing is achieved at high rotating speeds for a shaft journalled within a support housing.

A Vee-shape in the centrifugal section of the seal, with the Vee coming almost to a point at the outer extremity, has the advantage of minimizing the volume of fluid required to set up the centrifugal seal action. With the shaft at low-speed or stationary, the amount of fluid that is contained between the teeth in the central part of the seal during magnetic sealing is limited. When thrown out by centrifugal force this fluid forms the sealing fluid in the centrifugal section. The simple Vee-shape results in no wasted volume at the outer periphery, and therefore, more fluid volume available to set up a radius difference between the two sides to accommodate an imposed pressure difference during centrifugal sealing. A second desirable feature of the Vee-shape seal is available with very shallow or flat Vees where the side of the Vee lie within an angle of 5° to 8° of the shaft axis and provides a means for allowing large axial movement, or growth, of the shaft without having too much change in the tooth gap in the magnetic part of the seal. One still wants, however, to have a conical, or Vee-shape cross section so that when the shaft speeds up, magnetic fluid will flow toward the centrifugal section of the seal.

SUMMARY OF THE INVENTION

The present invention provides an improved Vee-shaped combined magnetic/centrifugal seal structure for use in certain rotating shaft-housing designs for accomplishing the same purpose.

It is therefore a primary object of the present invention to provide a new and improved Vee-shaped combined magnetic/centrifugal seal and method of operating the same for use in sealing rotating shafts journalled in a housing at both standstill and low rotating speeds as well as at high rotating speeds.

In practicing the invention a combined magnetic/centrifugal seal for a rotating shaft rotatably supported within a housing, is provided. The rotating shaft may be of the type having a generally circular cross section and is provided with at least one radially extending, generally Vee-shaped cross section circumferential portion formed about the periphery of the shaft. A plurality of radially extended circumferential teeth are concentrically arrayed around the periphery of the rotating member in parallel relationship to the Vee-shaped circumferential portion on the rotating shaft on each side thereof and are spaced closely adjacent to the Vee-shaped circumferential portion. The plurality of radially extending circumferential teeth may be formed on either the shaft or on the housing which surrounds the shaft or both. The housing has a complementary generally Vee-shaped cross section portion within which the Vee-shaped circumferential portion on the rotating shaft rides and within which the concentrically arrayed circumferential teeth extend. A magnetically susceptible ferrofluid is disposed within the space defined between the complementary Vee-shaped cross section portion of the housing and the Vee-shaped cross section circumferential portion on the rotating shaft for forming a centrifugal seal during high speed rotation of the rotating shaft. The ferrofluid also communicates with the gaps formed between the concentrically arrayed circumferential teeth extending within the spaces defined between the housing and the rotating member on each side of the Vee-shaped cross section circumferential portion. The structure is completed by means for impressing a magnetic field across the last-mentioned spaces between the housing and the rotating shaft Vee-shaped portion to form a plurality of magnetic seal gaps thereacross within which the ferrofluidic fluid is trapped while the rotating shaft is at standstill and at low rotating speeds to form a multi-stage magnetic seal on each side of the Vee-shaped portion of the shaft.

The means for impressing a magnetic field across the magnetic gaps preferably comprises a permanent magnet but also may comprise a selectively operable electromagnet for applying the magnetic field only during periods while the rotating member is at standstill or low rotating speeds and for selectively removing the magnetic field at high rotating speeds whereby at standstill and low rotating speeds a multi-stage magnetic seal is formed across at least one side of the Vee-shaped portion of the shaft and in most designs on both sides and at high rotating speeds a centrifugal seal is formed with the Vee.

The concentrically arrayed, radially extending circumferential teeth formed around the periphery of the rotating shaft each comprise magnetic pole piece members fabricated from highly magnetically permeable material and are connected in a closed magnetic circuit together with the magnetic field producing means and the gaps within which the ferrofluidic fluid are trapped. The concentrically arrayed, radially extending teeth may be formed either on the rotating shaft or on the complementary Vee-shaped housing portion or both.

In certain designs, after operating the seal at high rotating speeds in the centrifugal sealing mode, and after slow down of the shaft rotational speed, the magnetic field may be de-energized for a predetermined period of time sufficient to gravity drain the ferrofluid out of the space between the Vee-shaped portion on the shaft and the complementary Vee-shaped housing portion to a sump at the bottom of the housing and thereafter, following the period of drainage, the magnetic field producing means is energized to convert the structure to a magnetic sealing phase of operation at the lower rotating speeds or standstill.

BRIEF DESCRIPTION OF DRAWINGS

Other objects, features and many of the attendant advantages of this invention will become better understood upon a reading of the following detailed description, when considered in conjunction with the accompanying drawings wherein like parts in each of the several figures are identified by the same reference character, and wherein:

FIG. 2A is a partial, sectional view of an alternative form of Vee-shaped magnetic/centrifugal seal constructed according to the invention;

FIG. 2B is a cross sectional view of the alternative form of seal structure shown in FIG. 2A;

FIG. 2C is a partial sectional view of the lower end of the seal shown in FIGS. 2A and 2B, and illustrates the seal operating in the magnetic sealing mode; and FIG. 2D is a partial sectional view of the form of seal shown in FIGS. 2A, 2B and 2C, but illustrates the seal operating in the centrifugal sealing mode at high rotating speeds.

BEST MODE OF PRACTICING INVENTION

Figure 1A:
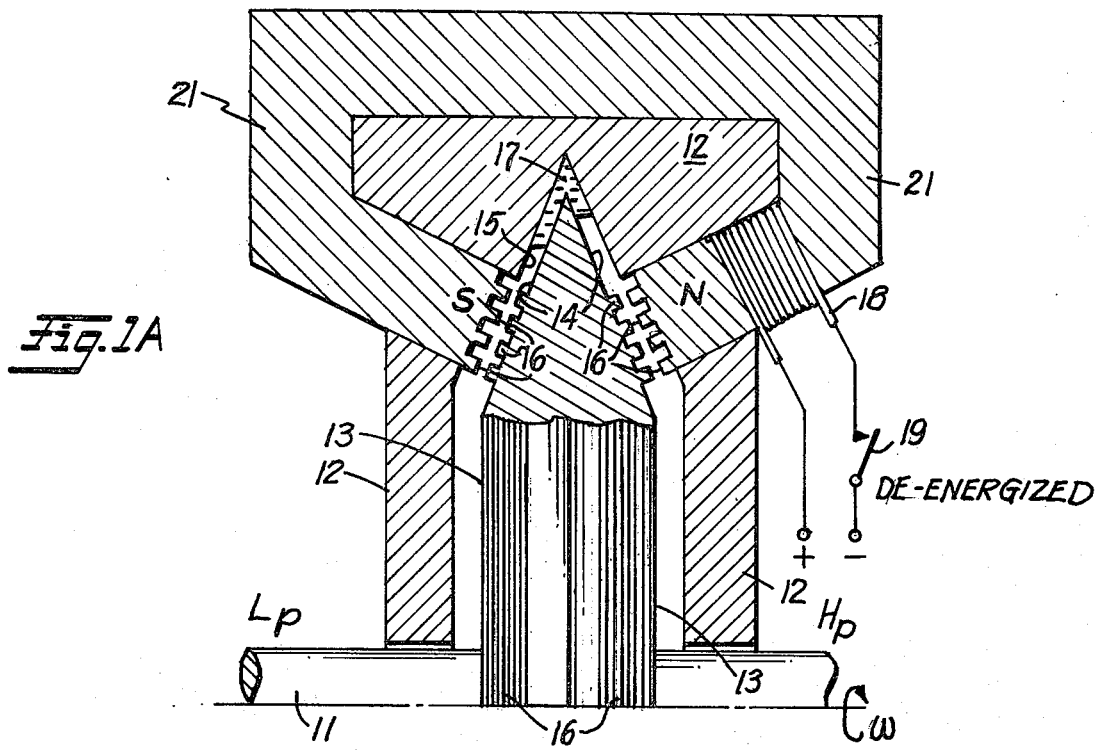
FIG. 1A is a partial sectional view of an improved Vee-shaped magnetic/centrifugal seal constructed according to the invention, and illustrates the seal in the centrifugal sealing mode of operation.
Figure 1B:
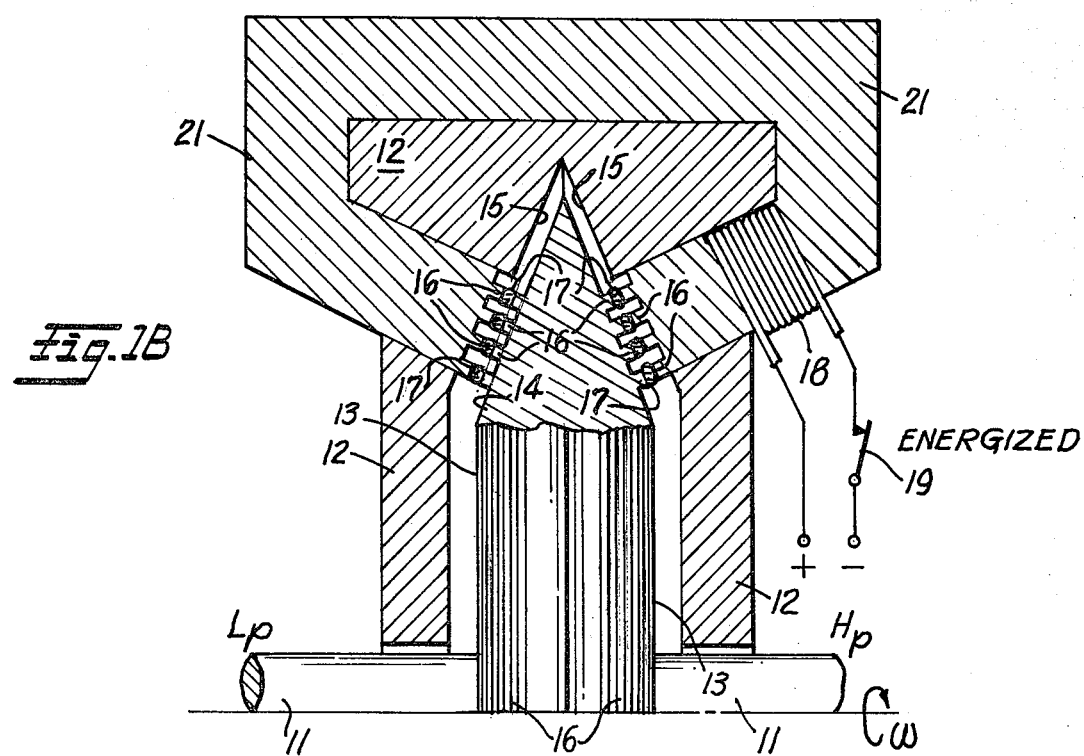
FIG. 1B is a partial sectional view of the Vee-shaped magnetic/centrifugal seal shown in FIG. 1A, but illustrates the seal in the magnetic sealing operating mode.

FIG. 1A is a partial sectional view of an improved, combined magnetic/centrifugal seal according to the invention and comprises a rotating shaft 11 which is journalled within and supported by a housing shown generally at 12. Secured to shaft 11 either by being keyed thereto, welded or otherwise is a circular disk portion 13 having an outer, peripheral Vee-shaped cross-section circumferential portion 14 formed about its outer periphery. The housing 12 has a complementary generally Vee-shaped cross section portion shown at 15 within which the Vee-shaped circumferential portion 14 on rotating shaft 11 rides. A plurality of radially extending, circumferential teeth shown at 16 are arrayed concentrically around the periphery of shaft 11 in parallel relationship with the Vee-shaped circumferential portion 14 on each side thereof and are spaced closely adjacent to the opposed surfaces of Vee-shaped portion 14. The Vee-shaped portion 14 on shaft 11 in conjunction with the complementary generally Vee-shaped cross section portion 15 of housing 12, defines a space therebetween within which the concentrically arrayed, circumferential teeth 16 extend. A magnetically susceptible, ferrofluidic fluid 17 is disposed within this space so as to form a centrifugal seal during high speed rotation of shaft 11 in the space between housing portion 15 and Vee-shaped portion 14 as shown at 17 in FIG. 1A. The ferrofluid 17 also communicates with the gaps defined between the ends of the concentrically arrayed, circumferential teeth 16 and the opposed surfaces of the Vee-shaped portion 14 on shaft 11 as shown in FIG. 1B. The structure is completed by means for impressing a magnetic field across the gaps thus defined so as to form a plurality of magnetic seal gaps within which the ferrofluid 17 is trapped with shaft 11 at standstill and low shaft speeds.

In FIGS. 1A and 1B the seal is symmetrically designed with radially extended circumferential teeth on both sides of the centrifugal section. This has the natural advantage that the seal can then handle a pressure difference in either direction across it. However, there will be many applications where the direction of the pressure difference is fixed, and where several stages of seal need to be placed in series. In this type of environment or application, the teeth may have to be formed on only one side of the centrifugal section.

The means for impressing a magnetic field across the gap spaces between the concentrically arrayed projections 16 and the opposing surfaces of the generally Vee-shaped rotor projection 14, may comprise either a permanent magnet or an electromagnet. If a permanent magnet is employed, then it would be inserted as part of the horseshoe-shaped member 21 shown in FIGS. 1A or 1B. If an electromagnet is used, it would employ an electromagnetic coil 18 energized from a source of direct electric current (not shown) via a selectively operable on-off switch 19. The electromagnetic coil 18 would surround horseshoe-shaped member 21 which would comprise a magnetically permeable core member surrounding housing 12 and shaft 11 in the manner of an automobile tire. Horseshoe-shaped magnetic core member 21 is supported by housing 12 in the manner shown in FIGS. 1A and 1B. Core member 21 has the concentrically arrayed circumferential teeth 16 formed in the end thereof and positioned opposite the surfaces of the generally Vee-shaped rotor member 14 to defined magnetic gap spaces within which the ferrofluid 17 will agglomerate during low speed rotation of shaft 11 and Vee-shaped rotor member 14 as well as at standstill. By this construction, the magnetically permeable, horseshoe-shaped core member 21 together with the generally Vee-shaped rotor member 14 and the gaps defined between the concentrically arrayed teeth 16, when filled with the ferrofluid 17, will form a closed magnetic circuit to assure formation of a plural stage magnetic seal on each side of Vee-shaped member 14 during low speed rotation of shaft 11 and at standstill.

It is assumed that the shaft 11 will be at standstill prior to starting shaft 11 and that it is desired to seal a higher pressure atmosphere shown at $H_p$ on the right hand side of FIGS. 1A and 1B from a lower pressure atmosphere shown at $L_p$ on the left hand side of the figures. Under such conditions, a strong magnetic field across the gap between the ends of the circumferential teeth 16 on core member 21 and the opposing surfaces of the Vee-shaped rotor member 14 produces a plural stage magnetic seal that prevents the higher pressure atmosphere $H_p$ from entering into and intermixing with the lower pressure atmosphere $L_p$. The plural stage magnetic seal will be maintained for rotational speeds up to some point at which the centrifugal forces acting upon the ferrofluid 17 exceeds the magnetic force retaining the fluid between the teeth 16 and will sling the fluid into the crotch of the Vee as shown at 17 in FIG. 1A.

The radially extending circumferential teeth 16 may be formed either on the shaft or on the housing which surrounds the shaft. The teeth may also be placed on both the shaft and the housing. Having teeth on both members doubles the magnitude of the gaps that can be used to attain the same performance. However, for a flat Vee design as shown in FIGS. 2A, B, C, and D, it is necessary to have teeth on only one member, so that when the shaft moves axially with respect to the housing, opposing teeth do not become misaligned with each other as would happen if there were teeth on both members. The question then is, on which member should the teeth be placed? The answer is that they should be placed on the rotor for two reasons. The first reason is that with teeth on the rotor, the fluid is driven by centrifugal forces into the gap areas, and thence out into the centrifugal seal area, whereas with teeth on the stator, centrifugal force will tend to move fluid away from the gaps. The result is that with a toothed rotor, the fluid in the seal gap will be retained longer as it comes up to the transition speed. The second reason for placing the teeth on the rotating element is that the fluid forces will move the fluid toward the larger radius, assisting the transition to the centrifugal mode of operation. Teeth on the stator will tend to trap much of the fluid between the teeth and make it difficult to make the transition to the centrifugal sealing mode of operation.

If an electromagnetic is used, the electromagnet 18 can be de-energized by opening switch 19 whereby the magnetic forces tending to hold the ferrofluid 17 in the magnetic gaps is reduced and allows the fluid to move to the centrifugal sealing position as shown at 17 in FIG. 1A more readily. The rotational speed at which this transition occurs, either in speeding up or slowing down, is dependent upon a number of design factors. Among these, for example, are: the diameter of the seal, the tooth gap, the tooth width, the magnetic flux level across the teeth, the magnetic susceptibility of the ferrofluid and the $\Delta P$ across the seal. Thereafter, if the shaft 11 and its attached Vee-shaped rotor member 14 are slowed below the transitional speed, the centrifugal forces holding the ferrofluid 17 in the centrifugal sealing position are reduced sufficiently that magnetic forces will overcome the centrifugal forces and reestablish the plural stage magnetic seal as shown in FIG. 1B. Since there are no moving, rubbing or contacting parts in either the magnetic or centrifugal sealing mode, no wear takes place which tends to deteriorate the quality of the seal provided by the combined magnetic/centrifugal seal.

There are a number of factors controlling the choice of either a permanent magnet or an electromagnet. From a design point of view, one would prefer to use a permanent magnet. One of the reasons for using an electromagnet is to allow the fluid to pool in the bottom of the seal groove when the electromagnet is turned off and the shaft speed decreases to a low value on stopping as described hereafter. Then when the electromagnet is turned on, the fluid is drawn into each of the several tooth spaces. A second reason is that it permits easier assembly of the seal parts into the machine, since magnetic forces are not present to jam the parts during assembly. A third reason is that in developing the design of a new seal, it is convenient to be able to control the MMF of the magnet in determining the correct minimum value. Perhaps the most important reason for using a permanent magnet is that if the process described above employing the electromagnet is used, and the fluid is allowed to pool with the magnet shut off, then there is a time interval during the shutdown cycle when no sealing is accomplished and substantial leakage past the seal can occur. A second reason is that since the electromagnet must be on during the off period of machinery employing the seal, power must be expended during that period to maintain the seal. A third reason is that some sort of speed sensitive switch is required to switch an electromagnet on and off at the correct speed. A fourth reason is that the use of the electromagnet consumes power and, by comparison, a simple permanent magnet operates in a passive mode and requires no external power.

FIG. 2A illustrates a modified form of an improved, combined, magnetic/centrifugal seal constructed according to the invention. For simplicity in illustration, the embodiment of the invention shown in FIGS. 2A-2D has not been illustrated to include the highly permeable, closed circuit magnetic path producing elements such as illustrated at 21 in FIGS. 1A and 1B; however, any practical construction of the seal shown in FIGS. 2A-2D would of course provide such members in the manner depicted in FIGS. 1A and 1B. In FIG. 2A, shaft 11 is provided with a cylindrical oil drum-shaped rotor member 13 which is secured to shaft 11 by welding, keying, or some other known manner, and has formed around its central, outer periphery a generally Vee-shaped portion 14 that has a relatively flat Vee angle of the order of 5° to 8° measured with respect to the axis of shaft 11 and that is designed to ride within a complementary Vee-shaped housing portion 15 formed in housing member 12.

The complementary, Vee-shaped housing portion 15 has winged extensions shown at 22 formed on each side thereof which define surfaces that oppose a plurality of parallel arrayed circumferential teeth 16 formed around the outer periphery of the drum member 13 secured to shaft 11 and on which the central Vee-shaped portion 14 is formed. This portion of housing member 12 is formed by a material 21 which is of a highly magnetic permeable nature so that it can be included in a closed magnetic path which would be further comprised by either a permanent magnet member or the core of an electromagnetic coil such as 18 connected through a selectively operable switch such as 19 in FIG. 1A to a source of electric current. The parallel arrayed, concentric teeth 16 which oppose the winged extensions of the complementary Vee-shaped housing portion 15 likewise are formed from a highly magnetic permeable material so as to define closely spaced-apart gaps between their outer peripheral edges and the opposing surfaces 22 of the winged extensions of the Vee-shaped complementary housing portion. If desired, the central Vee-shaped portion 14 on rotor member 13 may be fabricated from nonmagnetic material so as to further concentrate lines of magnetic flux across the gaps defined between the parallel arrayed, concentric teeth 16 and the opposing surfaces of the winged extension portions 22 of housing member 12.

In the embodiment of the invention shown in FIGS. 2A and 2B, the ferrofluidic fluid 17 is shown disposed in a sump at the bottom of the housing member 12 where it would lie if the rotor member 11, 13 and 14 were at rest and the electromagnet used to excite the closed magnetic path including housing portion 12, the projections 16, and the gaps between projections 16 and the winged extensions 22 of the complementary Vee-shaped housing 15, if it were not magnetized. Upon closure of the magnetic circuit by exciting the electromagnetic coil, such as 18 in FIG. 1A, provided for magnetically permeable housing portion 21, the ferrofluid 17 would be concentrated in the gaps or spaces defined between the outer peripheral edges of the concentric teeth 16 and the opposing surfaces of the winged extensions 22 of complementary Vee-shaped housing portion 15 as shown in FIG. 2C of the drawings. Thereafter, as the rotor member 11, 13 and 14 is brought up to speed and exceeds the transitional speed as described earlier with regard to FIGS. 1A and 1B, the ferrofluidic fluid will be thrown outwardly and concentrated in the Vee-shaped space between the complementary Vee-shaped housing portion 15 and the Vee-shaped portion 14 as shown in FIG. 2D of the drawings.

During operation of the combined magnetic/centrifugal seal as described above, under certain circumstances, while slowing the rotor from a high speed, centrifugal sealing mode and changing to the magnetic sealing mode, a condition can occur where the ferrofluid 17 reaches only the first sealing tooth 16 adjacent each side of the central Vee-shaped portion 14. Where a single stage magnetic seal is thus initially formed early, it can block the remainder of the ferrofluidic fluid from reaching the remaining further out circumferential teeth 16, and hence prevent formation of a complete multi-stage magnetic seal. To prevent this, the invention makes available an improved method of operation whereby during slow-down, the electromagnetic field is not energized until after the ferrofluidic fluid 17 is allowed to drain down to the bottom of the sump as shown in FIGS. 2A and 2B of the drawings. Upon reaching this condition, the ferrofluid 17 will immerse and be in contact with the lower edges of all of the parallel arrayed, concentric teeth 16 as clearly shown in FIGS. 2A and 2B. At this point, the electromagnetic field then can be energized so that the magnetic fluid will be caused to wrap itself around all of the concentric teeth 16 over the entire 360 degrees of their periphery thereby forming a complete, plural stage magnetic seal and overcoming the problem discussed briefly above.

From the foregoing description it will be seen that in the FIGS. 2A, 2B, 2C and 2D embodiments of the invention, the flat angled Vee shape of the rotor coupled with the circumferential teeth being formed on the rotor, allows for relatively large axial movement or growth of the shaft without having too much change in tooth gap in the magnetic sealing stages. The design is such, however, that there is still sufficient conical or Vee shape so that when the shaft speeds up, fluid will flow into the centrifugal sealing stage.

From the foregoing description it will be appreciated that the invention provides new and improved Vee-shaped combined magnetic/centrifugal seal structures together with a method of operating the same for use in sealing rotating shafts journalled in a housing at both standstill and low rotating speeds as well as at high rotating speeds.

Having described two embodiments of a new and improved Vee-shaped magnetic/centrifugal seal and method of operation according to the invention, it is believed obvious that other modifications, additions, deletions and changes in the embodiments of the invention disclosed will occur to those skilled in the art in the light of the above teachings. It is therefore to be understood that all such obvious modifications and changes are believed to come within the scope of the invention as defined by the appended claims.

What is claimed is:

1. A combined magnetic/centrifugal seal for a rotating member rotatably supported within a housing, said rotating member having a generally circular cross section and an enlarged diameter cylindrical drum-like portion with at least one radially extending, generally Vee-shaped in cross section circumferential portion formed about the periphery of the enlarged diameter cylindrical drum-like portion, a plurality of radially extending circumferential teeth concentrically arrayed around the periphery of the enlarged diameter cylindrical drum-like portion in parallel relationship to said Vee-shaped circumferential portion on the rotating member on at least one side thereof and spaced closely adjacent thereto, said housing having a hollow complementary generally Vee-shaped and drum-like cross section portion within which the Vee-shaped and enlarged diameter cylindrical drum-like circumferential portions on the rotating member ride and in conjunction with the Vee-shaped and drum-like cross section portions define a space within which said concentrically arrayed circumferential teeth extend, a magnetically susceptible ferrofluid disposed within the space defined between the complementary Vee-shaped cross section portion of the housing and the Vee-shaped circumferential portion of the rotating member for forming a centrifugal seal during high speed rotation of the rotating member, said ferrofluid also communicating with the gaps formed by the concentrically arrayed circumferential teeth extending within the space defined between said complementary housing portion and the enlarged diameter cylindrical drum-like portion of the rotating member on at least one side of the Vee-shaped circumferential portion, and means for impressing a magnetic field across said last mentioned space to form a plurality of magnetic seal gaps thereacross within which said ferrofluid is trapped with said rotating member at standstill and at low rotating speeds to form a multi-stage seal on at least one side of the Vee-shaped circumferential portion.

2. A combined magnetic/centrifugal seal according to claim 1 wherein the concentrically arrayed, radially extending circumferential teeth formed around the periphery of the rotating member comprise magnetic pole piece members fabricated from magnetically permeable material and are connected in a closed magnetic circuit together with a magnetic field producing means and the gaps within which the ferrofluidic fluid are trapped.

3. A combined magnetic/centrifugal seal according to claim 2 wherein the magnetic field producing means comprises a permanent magnet.

4. A combined magnetic/centrifugal seal according to claim 2 wherein the magnetic field producing means comprises selectively operable means for applying the magnetic field only during periods while the rotating member is at standstill or low rotating speeds and for selectively removing the magnetic field at high rotating speeds whereby at standstill and low rotating speeds a multi-stage magnetic seal is formed on at least one side of the Vee-shaped projection and at high rotating speeds a centrifugal seal is formed with the Vee.

5. A combined magnetic/centrifugal seal according to claim 2 wherein the concentrically arrayed radially extending teeth are formed on the rotating member.

6. A combined magnetic/centrifugal seal according to claim 2 wherein the concentrically arrayed radially extending teeth are formed on the complementary Vee-shaped housing portion.

7. A combined magnetic/centrifugal seal according to claim 2 wherein the concentrically arrayed radially extending teeth are formed on both the rotating member and the complementary Vee-shaped housing portion.

8. A combined magnetic/centrifugal seal according to claim 1 wherein the enlarged diameter cylindrical drum-like portion has a peripheral rim area which forms a relatively flat longitudinally extending taper wherein the sloping sides of the tapered rim area form an angle of about 5°-8° measured with respect to the rotor axis.

9. The method of operating a magnetic/centrifugal seal of the type comprising a rotor having a generally circular cross section and an enlarged diameter cylindrical drum-like portion with a Vee-shaped cross section peripheral rim portion and rotatably secured within a housing having a complementary hollow drum-like and Vee-shape portion, and a plurality of radially extending circumferential teeth concentrically arrayed around the periphery of the rotor on at least one side of said Vee-shaped rim portion and extending into the space defined between the enlarged diameter drum-like and Vee-shaped cross section rotor portion and the complementary hollow enlarged diameter drum-like and Vee-shaped housing portion with said space containing a ferrofluid and further including selectively operable magnetic field producing means for producing a plurality of magnetic gaps between the concentrically arrayed projections and their opposing surfaces under magnetic sealing operating conditions; said method comprising the step of maintaining the magnetic field de-energized for a predetermined period of time sufficient to gravity drain the ferrofluid into the complementary hollow enlarged diameter drum-like Vee-shaped housing portion as a sump prior to energizing the magnetic field to convert to a magnetic sealing phase of operation following high speed operation of the rotor under centrifugal sealing conditions.

* * * * *